United States Patent [19]
Freber

[11] 3,799,283
[45] Mar. 26, 1974

[54] GO-CART AND FRAME THEREFOR

[75] Inventor: Elmer C. Freber, St. Louis, Mo.

[73] Assignee: Marquette Tool and Die Company, St. Louis, Mo.

[22] Filed: July 3, 1972

[21] Appl. No.: 268,737

[52] U.S. Cl.................. 180/56, 180/72, 280/106 R
[51] Int. Cl............................................. B60g 9/00
[58] Field of Search............. 180/11, 70, 71, 72, 75, 180/56, 58; 267/57.1 R, 57.1 A, 21, 20; 280/106 R, 106.5, 269

[56] References Cited
UNITED STATES PATENTS

| | | | |
|---|---|---|---|
| 3,022,846 | 2/1962 | Thompson | 280/106 R |
| 1,575,883 | 3/1926 | White | 280/106 R |
| 2,330,482 | 9/1943 | Fageol | 267/57.1 R |
| 3,706,481 | 12/1972 | Kramer | 267/57.1 A |
| 3,177,962 | 4/1965 | Bailey | 180/11 |
| 3,572,677 | 3/1971 | Damon | 267/57.1 R |

*Primary Examiner*—Kenneth H. Betts
*Attorney, Agent, or Firm*—Gravely, Lieder & Woodruff

[57] ABSTRACT

A go-cart has a frame provided with longitudinal frame rails, a rear cross member extended across the rear ends of the longitudinal rails and resiliently connected thereto, and suspension arms positioned to the sides of the longitudinal rails and extended between the side rails and the rear cross member. The suspension arms at their forward ends are pivotally connected to the side rails about axes extending longitudinally of the frame and at their rear ends are pivotally connected to the rear cross member about axes extending transversely of the frame, all to provide the frame with a relatively high degree of flexibility. A rear drive axle, having wheels at its ends, extends through and is journaled in the suspension arms, but not the longitudinal rails. The suspension arms further carry the motors which power the drive axle. Since the frame is quite flexible, the wheels of the car tend to remain in contact with the ground even where the track has extensive surface irregularities. Also, the longitudinal rails bow upwardly over the rear axle with sufficient clearance to permit axle mounted components such as centrifugal clutches to be shifted along the axle to afford access thereto, thus permitting servicing without disassembling the entire rear end of the go-cart.

18 Claims, 7 Drawing Figures

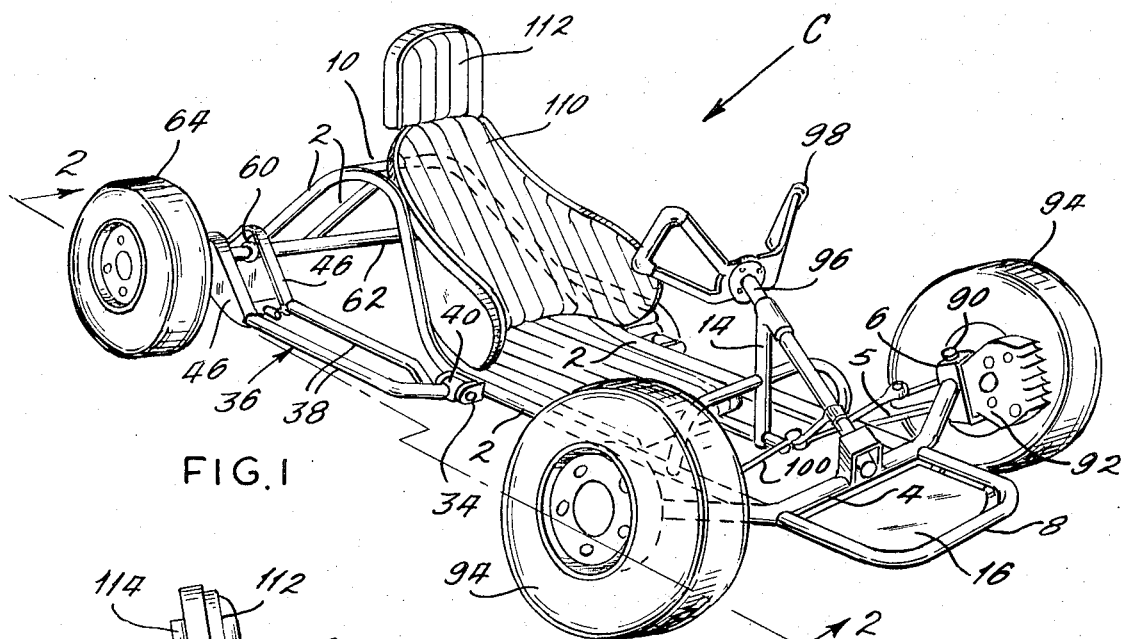
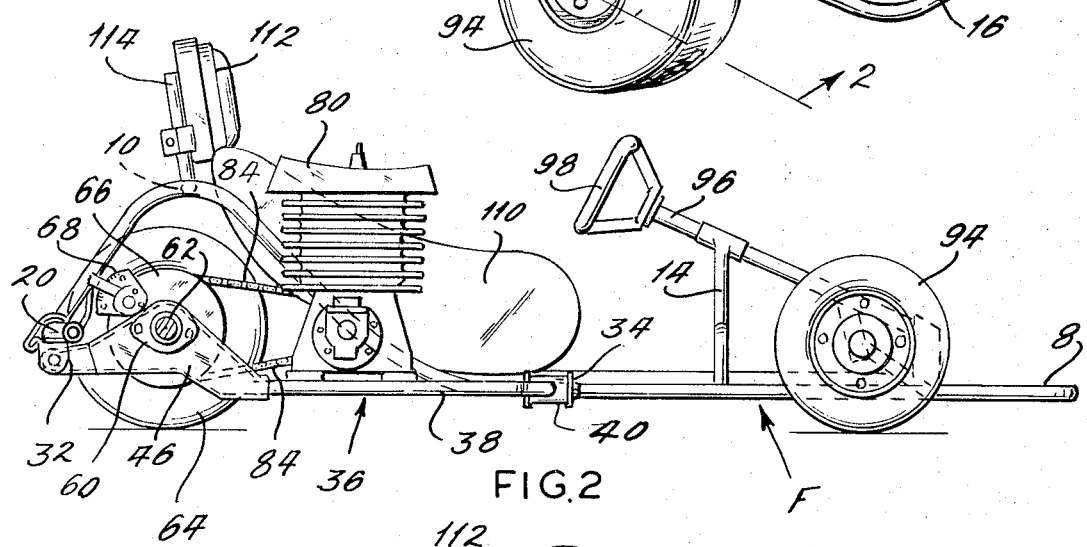
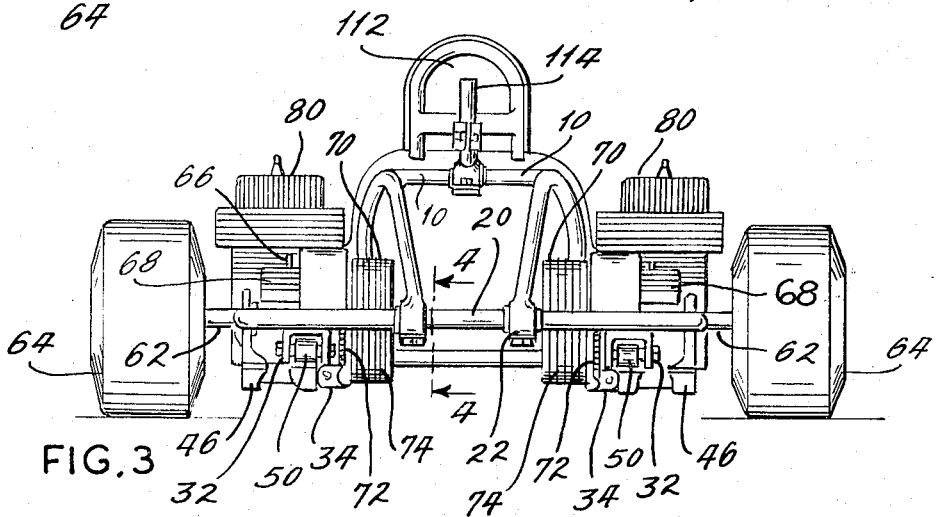

GO-CART AND FRAME THEREFOR

BACKGROUND OF THE INVENTION

This invention relates to automotive vehicles and more particularly to small vehicles commonly known as go-carts.

The typical go-cart of current manufacture is a relatively simple vehicle large enough to accommodate only one individual. Its frame is usually formed from segments of steel tubing rigidly welded together, and the rear axle is connected to this frame by means of rigid bearing hangers. While the frame flexes a limited amount as the go-cart negotiates curves, the amount of flexure is not enough to assure optimum traction, particularly on rough track surfaces. Thus, the vehicle tends to bounce erratically and slide out on curves. Moreover, as a consequence of the rigid frame construction, engine vibrations are transmitted throughout the entire frame and endanger the welded joints by subjecting them to excessive stresses.

In those carts having their centrifugal clutches mounted on the rear axle, the longitudinal frame rails usually pass close to the clutches, and as a result it is practically impossible to service the clutches without disassembling the entire rear end of the go-cart. Indeed, many carts cannot utilize axle clutches without undergoing major frame modifications, and for this reason axle clutches are less popular than engine mounted clutches.

Moreover, most go-carts of current manufacture are suitable for use with one or two types of engines, but not with a wide variety of engines. The same is also true of clutches.

SUMMARY OF THE INVENTION

One of the principal objects of the present invention is to provide a go-cart frame which has a relatively high degree of flexibility to provide optimum traction as the go-cart negotiates curves and irregular track surfaces and as the go-cart accelerates and decelerates. Another object is to provide a go-cart frame which to a large measure isolates engine vibrations to a small portion thereof so as to reduce the transmission of vibrations to the remainder of the frame and the driver. An additional object is to provide a frame which does not obstruct components of the drive train for the cart so that those components are easily serviced. Still another object is to provide a frame capable of accommodating a wide variety of motors without undergoing a major reconstruction. Yet another object is to provide a frame with a unique suspension-weight transfer system that affords optimum weight transfer in cornering and during acceleration and braking. A further object is to provide a go-cart with the improved frame of the present invention. Still another object is to provide a go-cart having the ride stability of a long wheelbase cart and the cornering quickness of a short wheelbase cart. These and other objects and advantages will become apparent hereinafter.

The present invention is embodied in a go-cart having a frame including longitudinal rails, a rear cross member extending across the rear ends of the rails, and suspension arms extended between the longitudinal frame rails and the rear cross member. The longitudinal rails, the rear cross member and the suspension arms are all connected so that the resulting frame is quite flexible. The invention also resides in the frame itself. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a go-cart constructed in accordance with and embodying the present invention, but with the drive train removed therefrom to better illustrate the frame construction;

FIG. 2 is a side elevational view, partially in section, taken along line 2—2 of FIG. 1 and also showing the drive train;

FIG. 3 is a rear elevational view of the go-cart;

DETAILED DESCRIPTION

Figure 5:
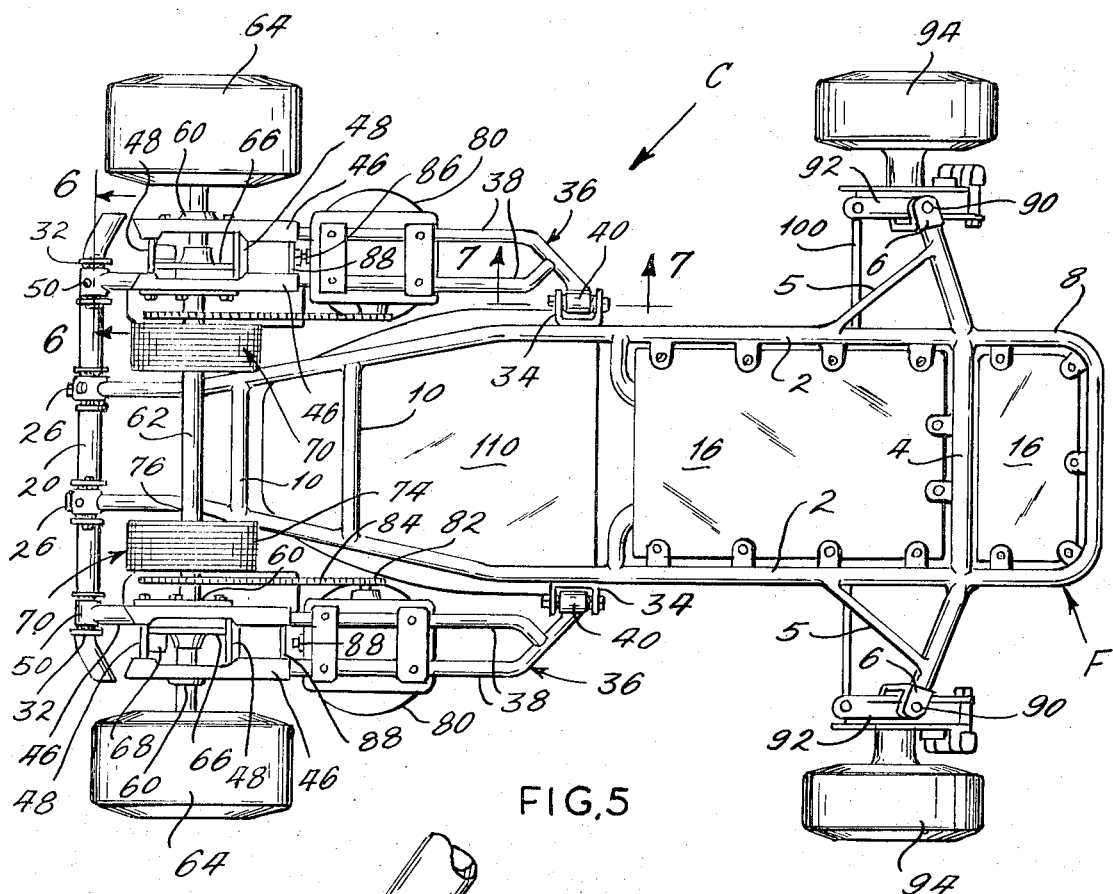
FIG. 5 is a bottom plan view of the go-cart.

Referring now to the drawings, C designates a go-cart which is basically a small automotive vehicle capable of accommodating only one individual. The go-cart C has a frame F including (FIGS. 1 and 5) a pair of longitudinal frame rails 2 which extend almost the entire length of the go-cart C on each side thereof. At their forward ends the longitudinal rails 2 are connected by a front cross member 4 which continues laterally beyond the frame rails 2 where it turns slightly upwardly. The lateral extensions of the front cross member 4 are reinforced by gussets 5, and welded to those lateral extensions are spindle yokes 6. Also welded to the front cross member 4, is a U-shaped end member 8 which forms a forward continuation of the two frame rails 2. For the most part, the frame rails 2 are straight and parallel, but near the rear of the cart they converge and bow upwardly with the convergence beginning about where the rails 2 turn upwardly or they take on any particular shape that facilitates the desired engine-clutch adaptation. The rails 2 further provide seat support by acting as integral seat back members or they may serve as support members for additional seating structures. To the rear of the front cross member 4 one or more intermediate cross members 10 are welded to and extend between the side rails 2 to strengthen the frame F. The number and location of the intermediate cross members D is dependent on the overall strength and flexibility desired. The frame F is further provided with an upwardly extending steering assembly support 14. The two longitudinal frame rails 2, the front cross member 4, the steering assembly support 14, the U-shaped member 8, and the intermediate cross members 10 are all tubular steel welded together as illustrated and previously described to form a unitary structure which may be termed the basic frame section.

At the forward portion of the go-cart C the voids between the frame rails 2 and the voids within the U-shaped end member 8 are occupied by floor boards 16.

Figure 4:
FIG. 4 is a sectional view taken along line 4—4 of FIG. 3 and showing the joinder of the side rails to the rear cross member.

Aside from the basic frame section heretofore described, the frame F further includes a rear cross member 20 which extends transversely across the rear of the go-cart C and is attached to the rear ends of the two longitudinal frame rails 2. The rear cross member 20 is at the extreme end of the cart C, and apart from serving as a structural member of the frame F, it also serves as a bumper. In contrast to conventional frame constructions, the connections joining the frame rails 2 to the rear cross member 20 are somewhat flexible joints which enable the longitudinal frame rails 2 to flex or move a limited extent with respect to the cross member 20. In particular, the frame rails 2 have arcuate end plates 22 (FIG. 4) welded to them at their rear ends, and these plates 22 receive elastomeric sleeves 24 which encircle the rear cross member 20. The plates 22 are clamped tightly against the sleeves 24 by means of cam-type retaining plates 26 which at their outer ends fit into grooves on the arcuate plates 22, and at their inner ends are secured to the arcuate plates 22 by means of bolts 28. To prevent the rear cross member 20 from shifting laterally with respect to the longitudinal frame rails 2, the arcuate end plates 22 on the latter are fitted with short axially extending pins 30 which project through the elastomeric sleeves 24 and into apertures in the rear cross member 20.

Set slightly inwardly from the outer end of the rear cross member 20 and projecting downwardly therefrom are rear suspension brackets or yokes 32 (FIGS. 2 and 3). These yokes 32 are welded securely to the cross member 20. Likewise, the longitudinal frame rails 2 have forward suspension brackets or yokes 34 (FIGS. 1, 2 and 5) welded to them immediately forwardly from the point at which the convergence of the two frame rails 2 commences. The yokes 34 project laterally and outwardly from the rails 2. Extending between the two yokes 32 and 34 on each side of the go-cart C are rear suspension arms 36, and each suspension arm 36 includes a pair of parallel rails 38, which like the longitudinal frame rails 2 are formed from steel tubing.

Figure 7:
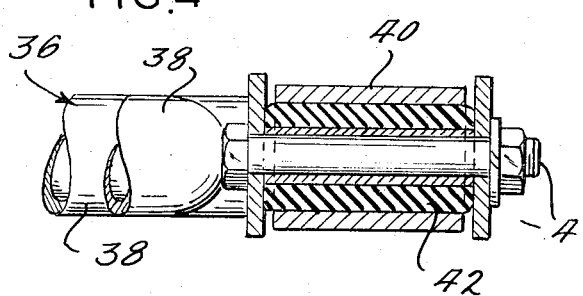

At the forward end of each suspension arm 36, the two rails 38 thereof converge and are welded to each other (FIG. 5). The outermost rail 38 furthermore continues inwardly beyond the welded joint and at its forward end is welded to a sleeve 40 which is disposed within the forward yoke 34 projecting from the adjacent frame rail 2. The sleeve 40 contains a steel-lined elastomeric bushing 42 (FIG. 7), and extended through this bushing 42 as well as through the yoke 34 is a bolt 44 which serves as a pivot for the front of the suspension arm 36. Thus, the front end of the suspension arm 36 is free to pivot relative to the adjacent longitudinal frame rail 2 about an axis extending generally lengthwise of the cart C.

Figure 6:
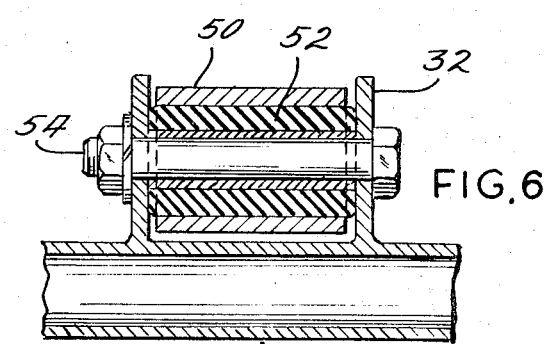
FIGS. 6 and 7 are sectional views taken along lines 6—6 and 7—7, respectively, of FIG. 5 and illustrating the connection of the suspension arms to the remainder of the go-cart frame.

The suspension arm 36 at its rear end is provided with a pair of mounting plates 46, each mounting plate being welded to and forming a continuation of one of the parallel rails 38. The plates 46 are positioned in a generally vertical disposition and are separated by spacer plates 48 (FIG. 5) which are welded thereto so that the suspension arm 36 is in effect a unitary structure. The innermost of the two mounting plates 48 projects rearwardly toward the rear cross member 20 (FIGS. 2 and 5) and is provided with a steel sleeve 50 which is disposed within the adjacent downwardly projecting yoke 32 on the rear cross member 20. Like its counterpart at the front of the suspension arm 36, the steel sleeve 50 contains a steel-lined elastomeric bushing 52 (FIG. 6). Extending through this bushing 50 and through the yoke 32 is a bolt 52 which serves as a pivot for the rear of the suspension member 36. Thus, the suspension arm 36 at its rear end is free to pivot a limited extent relative to the rear cross member 20 about an axis which extends transversely of the cart C.

Bolted to each of the mounting plates 46 on the suspension arms 36 are anti-friction bearings 60 (FIGS. 1, 2 and 5) which are aligned and receive a rear drive axle 62. At its ends, the axle 62 is fitted with drive wheels 64, and intermediate the two mounting plates 46 of each of the suspension arms 36, the axle 62 is further provided with brake disks 66 (FIGS. 3 and 5). The brake disks 66 rotate within a caliper assemblies 68 (FIGS. 2 and 3) which are bolted to the innermost of the two mounting plates 46 of the suspension arms 36. These caliper assemblies 68 have brake shoes which are usually hydraulically actuated and when so actuated clamp against the brake disks 66 and impede rotation of the rear drive axle 62.

In addition to the brake disks 66, the rear drive axle 62 carries a pair of friction clutches 70 (FIGS. 3 and 5) which are set immediately inwardly from the innermost of the two mounting plates 46 on each of the suspension arms 36. Each centrifugal clutch 70 includes a sprocket 72 which rotates a set of clutch shoes (not shown), and these clutch shoes are mounted such that they move outwardly under the influence of the centrifugal forces exerted upon them. The sprocket 72 is not locked to the axle 62, but a clutch drum 74 which also forms part of the clutch 70 is keyed to the axle 62. Thus, when the sprocket 72 rotates, the shoes within the clutch 70 are driven outwardly by centrifugal force and engage the friction surface of the drum, transferring power from the sprocket 72 to the drum 74. Each drum 74 is prevented from sliding inwardly on the axle 62 by a collar 76 (FIG. 5) retained in place by a set screw. When the set screw is loosened, both the collar 76 and the drum 74 may be shifted inwardly along the axle 62 to expose the interior components of the centrifugal clutch 70. In this respect, it should be noted that the curvature of the longitudinal frame rails 2 at the rear end of the frame is such that sufficient clearance exists around the axle 62 allow the clutch drums 74 to move inwardly. Consequently, the centrifugal clutch 70 may be serviced without disassembling the entire rear axle assembly, that is without removing the rear wheels 64 and without withdrawing the axle 62 from its bearing 60. The cart C, however, may have engine mounted clutches instead of the axle clutches 70.

Each suspension arm 36 immediately forwardly from the mounting plate 46 thereon supports an internal combustion engine 80 (FIGS. 2 and 5) which is usually of the single cylinder variety, and the drive shaft of this engine 80 is provided with a sprocket 82 which aligns with the sprocket 72 of the corresponding centrifugal clutch 70. Trained over each pair of aligned sprockets 72 and 82 is a roller-type chain 84. Each engine 80 is generally clamped against the parallel rails 38 of its suspension arm 36, and at its rear end its block abuts against a threaded adjusting bolt 86 (FIG. 5) which is threaded into a web 88 traversing cross plates 48. Thus, by rotating the bolt 86, the slack within the chain 84 is adjusted. The suspension arms 36 are matched with the engines 80 and may have to be changed to accommodate engines of different manufacture.

The spindle yokes 6 on the ends of the front cross member 4 have bolts 90 (FIGS. 1 and 5) extending generally vertically through them, and these bolts 90 serve as king pins for spindle assemblies 92 on which front wheels 94 are mounted. These spindles assemblies 92 may include disk-type front brakes.

Extended through the steering assembly support 14 is a steering column 96 (FIG. 1) having a steering wheel 98 at its upper end. At its lower end the steering column 96 is connected with the spindle assemblies 92 by means of tie rods 100.

Finally, the converging forward ends of the upwardly bowed portions of the longitudinal frame rails 2 form a cradle for a seat 110 which is, of course, located immediately behind the steering wheel 98. Continuing from the upper end of the seat 100 is a head restraint 112 supported on a post 114 (FIGS. 2 and 3) which is secured to the intermediate cross member 10 extending between the uppermost portion of the longitudinal frame rails 2.

In use, the engines 80 drive the rear axle through the centrifugal clutches 70 and propel the car C forwardly. Since the engines 80 are mounted entirely on the suspension arms 36, engine vibrations are to a large measure isolated and confined to the suspension arms 36 by the steel-lined elastomeric bushings 42 and 50. Thus, the major portion of the frame F, including the basic frame section, along the seat 110 supported thereby, receive only vibrations of relatively low magnitude, and this extends the life of the welded joints within the isolated portions of the frame.

Since the suspension arms 36 at their forward ends pivot about axes extending longitudinally of the frame and further since the rear ends of the longitudinal frame rails 2 are set in the elastomeric sleeves 24, the longitudinal frame rails 2 are permitted to move a relatively large amount with respect to the suspension arms 36 and the rear axle 62. This enables the frame F to flex so that the car C will follow track surface irregularities. In other words, even on rough surface tracks the four wheels 64 and 94 will remain on the track, thus affording excellent traction. The increased traction is particularly valuable in cornering for it greatly reduces the tendency to slide out or drift in turns. Moreover, in negotiating corners the basic frame section, that is the portion defined primarily by the longitudinal rails 2, tends to roll relative to the rear cross member 20 and the suspension arms 36 due to the flexible or resilient nature of the connections between the longitudinal rails 2 and rear cross member 20 and the pivotal nature of the connection between the longitudinal rails 2 and the suspension arms 36. The former connection is of course at the arcuate end plates 22 on the rear ends of the longitudinal rails 2, while the latter is along the mid-portions of the longitudinal rails at the forward yokes 34. The roll is always to the outside of the turn and has the effect of transferring more weight to the outside wheels 64, the weight transfer being primarily through the rear cross member 20 to the suspension arm 36 at the outside of the turn and thence to the rear wheel 64 through the rear axle 62.

The unique suspension incorporated into the frame F also affords better acceleration and braking. First of all, as previously mentioned, it enables all the wheels 64 and 94 to more closely follow the track surface, even when that surface is quite irregular. Also, with respect to acceleration, the torque developed by the engines 80 causes the suspension arms 36 to pull back in the direction opposite to the direction of rear wheel rotation, thereby increasing the load on the rear axle 62 and exerting a lifting force on the frame F at the forward yokes 34, that is at the joinder of the suspension arms 36 and longitudinal rails 2. The end result is a weight transfer from the front of the go-cart C to the rear wheels 64 which increases traction during acceleration. With respect to braking, the rear caliper assemblies 68, like the motors 80, are on the suspension arms 36 and when applied grip the rotating brake disks 66. The momentum of the brake disks 66 tends to rotate the caliper assemblies 68 and the suspension arms 36 in the direction of wheel rotation, and this in turn exerts a lifting force on the rear cross member 20 and a downward force on the mid-portions of the longitudinal rails 2. Thus, weight is naturally transferred forwardly to permit more effective use of front wheel brake systems and the superior stopping ability of such systems.

In short, the go-cart C has a unique suspension-weight transfer system that gives the ride stability of a long wheelbase cart and the cornering quickness of a short wheelbase cart. It provides smoothness and ease of handling heretofore unknown.

The upward curvature of the longitudinal frame rails 2 permits the centrifugal axle clutches 70 to be serviced without disassembling the entire rear end of the slot car C. Indeed, most servicing operations on either of the clutches 70 can be performed merely by loosening the set screw holding the collar 76 and then sliding the collar 76 and the clutch drum 74 associated therewith inwardly along the drive axle 62. This exposes the interior of the clutch 70 so that it can be serviced. On conventional frames, the longitudinal rails thereof often leave no space for axle mounted clutches and where they do permit the use of axle clutches, they are located close to the clutch drums and axles so that no room is available for moving the clutches along the axles to service them. It should be noted that the longitudinal frame rails 2 may be extended beneath the rear axle 62 and when so disposed the go cart C will not be deprived of its superior handling characteristics. However, the underlying longitudinal rails 2 will block movement of the clutch drums 74 along the axle 62.

Finally, should the operator decide to use different engines 80 which do not fit the existing suspension arms 36, it is not necessary to reconstruct the entire frame F as is the case with conventional go-carts. On the contrary, the operator need only remove the existing suspension arms 36 and replace them with suspension arms capable of accommodating the new engines. This is a relatively simple procedure requiring very little time.

This invention is intended to cover all changes and modifications of the example of the invention herein chosen for purposes of the disclosure which do not constitute departures from the spirit and scope of the invention. What is claimed is:

1. A frame for a go-cart, said frame comprising: longitudinal frame rails extending lengthwise of the cart; means connected with the longitudinal frame rails for mounting front wheels; a rear cross member connected to and extending between the longitudinal frame rails at the rear ends thereof; and elongated suspension arms extended longitudinally of the frame and connected between the longitudinal frame rails and the rear cross member for mounting a rear drive axle to which rear wheels are secured; the suspension arms being substantially rigid and further being pivotally connected to the frame rails for limited pivoting movement about axes fixed in position with respect to the frame rails and extending lengthwise of the frame.

2. A frame according to claim 1 wherein the suspension arms are pivotally connected to the rear cross member for limited pivotal movement about an axis fixed in position with respect to the rear cross member and extending transversely of the frame.

3. A frame according to claim 2 wherein the suspension arms are located generally outwardly from the frame rails and are pivotally connected to the rear cross member outwardly from the connections joining the longitudinal frame rails to the rear cross member.

4. A frame according to claim 3 wherein the suspension arms are pivotally connected to frame rails and to the rear cross member by means of elastomeric bushings to reduce the transmission of vibrations from the suspension arms to the longitudinal frame rails.

5. A frame according to claim 3 wherein the longitudinal frame members are resiliently connected to the rear cross member to permit the longitudinal frame members to flex a limited amount relative to the rear cross members and suspension arms.

6. A frame according to claim 5 wherein elastomeric elements are interposed between the longitudinal frame rails and the rear cross member to permit the longitudinal frame rails to flex a limited amount relative to the rear cross member and the suspension arms; and wherein the longitudinal frame rails are provided with pins which project through the elastomeric elements and into the rear cross member to prevent the rear cross member from shifting transversely with respect to the frame rails.

7. A frame according to claim 3 wherein the longitudinal frame rails extend above and are detached from the rear axle so that axle-mounted components may be shifted along the rear axle to ease servicing of such components.

8. A frame according to claim 1 wherein the rear cross member is at the extreme rear end of the frame and serves as a bumper for the go-cart.

9. A frame according to claim 1 and further characterized by a motor mount on at least one of the suspension arms.

10. A frame according to claim 1 wherein elastomeric elements are interposed between the longitudinal frame rails and the rear cross member to permit the longitudinal frame rails to flex a limited amount relative to the rear cross member and suspension arms.

11. A go-cart comprising: a frame having a pair of longitudinal frame rails, a rear cross member connected to and extending between the longitudinal frame rails, and suspension arms connected to and extending between the rear cross member and the frame rails, the suspension arms being substantially rigid and being capable of pivoting with respect to the longitudinal frame rails about axes fixed with respect to the frame rails and extending generally lengthwise of the frame; aligned bearings on the suspension arms; a rear axle received in the bearings of the suspension arms and rotatable relative to the suspension arms, the axle being detached from the longitudinal frame rails; wheels on the rear axle; a motor mounted on at least one of the suspension arms and connected with the rear axle for rotating the rear axle and the rear wheels; a seat carried by the frame; front wheels mounted on the frame for pivoting movement about a generally upright axis; and steering means for pivoting the front wheels about the generally upright axis to steer the go-cart.

12. A go-cart according to claim 11 wherein the suspension arms are located generally outwardly from the longitudinal frame rails.

13. A go-cart according to claim 12 wherein the suspension arms are pivotally connected to the rear cross member for pivoting movement about an axis extending generally transversely of the frame.

14. A go-cart according to claim 13 wherein the suspension arms are pivotally connected to the longitudinal rails and to the rear cross member through elastomeric bushings to reduce the transmission of vibrations from the motor to the longitudinal frame rails.

15. A go-cart according to claim 13 wherein an elastomeric element is interposed between the ends of the longitudinal frame rails and the rear cross member at the connection between the longitudinal rails to move relative to the rear cross member and suspension arms.

16. A go-cart according to claim 12 wherein the longitudinal frame rails are connected to the rear cross member inwardly from the connection between the rear cross member and the suspension arms.

17. A go-cart according to claim 11 wherein the longitudinal frame rails bow upwardly near the rear end of the frame and extend over the rear axle.

18. A go-cart according to claim 17 wherein the motor drives the rear axle through a clutch having a drum mounted on the axle; and wherein the curvature of the longitudinal frame rails at the rear of the frame is such that sufficient clearance exists around the rear axle to enable the clutch drum to be shifted along the axle and underneath at least one of the frame rails.

* * * * *